Patented May 24, 1927.

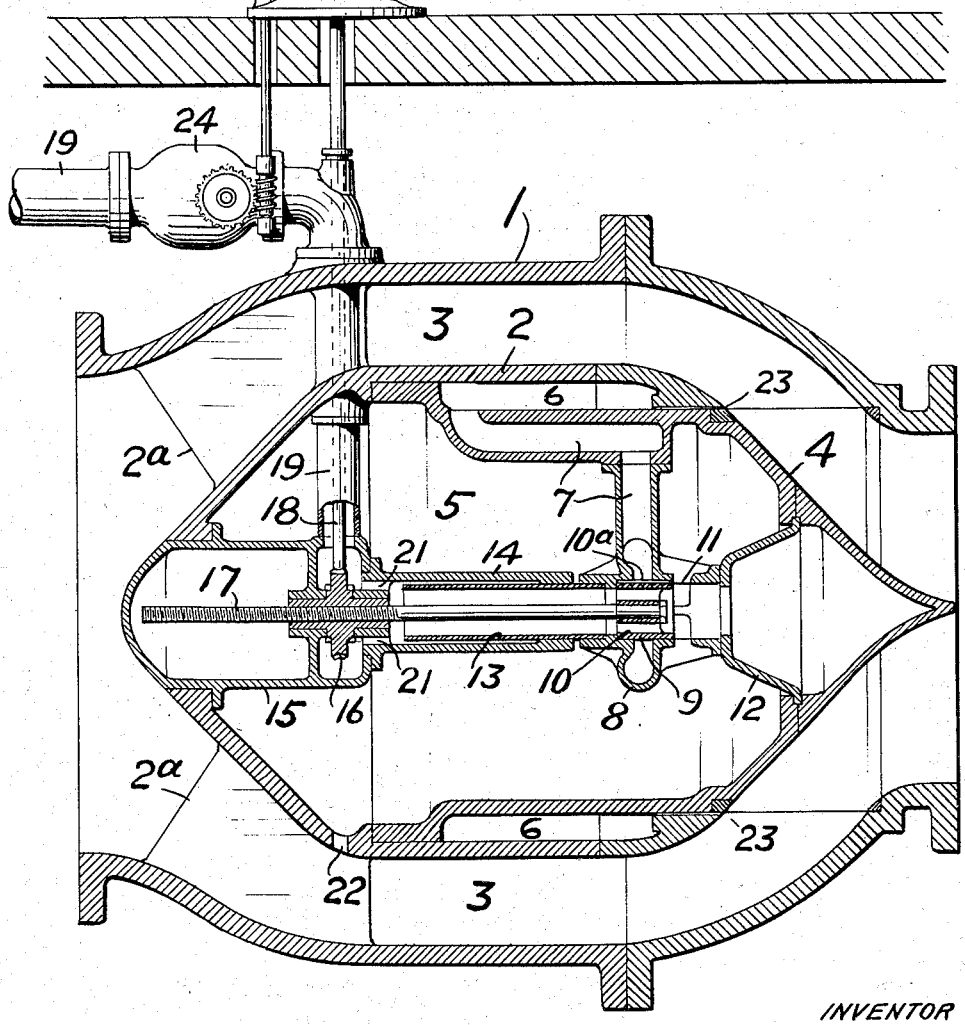

1,629,957

UNITED STATES PATENT OFFICE.

CHESTER W. LARNER, OF PHILADELPHIA, PENNSYLVANIA, ASSIGNOR, BY MESNE ASSIGNMENTS, TO I. P. MORRIS CORPORATION, A CORPORATION OF DELAWARE.

PLUNGER VALVE.

Application filed November 18, 1920, Serial No. 424,855. Renewed July 28, 1925.

My invention relates to pressure or hydraulically operated plunger valves comprising, substantially, a body and an open ended cylinder having a water way between them, and a plunger of which the nose co-operates with the body as a seat and which along with the cylinder, is shaped to provide cylindrical and annular chambers in respect to which pressure is admitted and exhausted to open and close the plunger.

The object of this invention is to provide a simple and reliable mechanism for opening and closing such valves with a controlled motion, the characteristics of which may be varied at will by the operator and which automatically applies to the valve plunger all or any part of the available hydraulic force which it may be necessary to apply in order to move the plunger. In other words, if the valve is clean and the plunger moves easily, the force applied is small, but if the valve becomes foul or in any way obstructed, the force applied to move the plunger is automatically increased up to the maximum force of which the valve is capable. At the same time, the rate of movement is controlled with precision and there is no chance of the plunger moving erratically or overtraveling, such tendencies being automatically corrected by the control mechanism.

By means of this control mechanism the valve may for example be "cracked" open very slightly and held stationary in that position for the purpose of filling or priming the pipe line or hydraulic system beyond the valve and after this has been done the valve may then be opened further at a rapid rate.

On the other hand, in closing, the valve may be closed rapidly to the point where the flow in the pipe line is being reduced by the throttling action of the valve and the rate of closing may then be reduced and the balance of the closing stroke made at a lower rate in order to prevent water hammer or undue pressure rise in the pipe line.

In addition to these advantages the plunger may be held with accuracy at intermediate positions and thus a valve so equipped may be used for regulating the flow in a conduit or for discharging a jet of water against atmospheric pressure, the amount of valve opening determining the quantity discharged.

The invention will be claimed at the end hereof but will be first described in connection with the accompanying drawings, forming part hereof and in which Figure 1 is a view principally in section, of a valve embodying features of the invention, and Fig. 2, is a similar view illustrating a modification.

The valve consists of a body 1 having an internal cylinder 2 connected to the body by radial ribs 2ª, and forming between them a water way 3. The internal cylinder 2 is closed at one end and contains a plunger 4 which is of differential form, thus providing a cylindrical operating chamber 5 and an annular operating chamber 6. The plunger 4 is moved by alternately admitting pressure to and exhausting pressure from chambers 5 and 6 in a manner familiar in the art.

Annular chamber 6 is connected by a passage 7 to a circular valve housing 8 having a circumferential port 9, the exhaust through which is controlled by a cylindrical sleeve valve 10, which also controls the exhaust through circumferential ports 11 in the housing 8. Housing 8 is connected to plunger 4 by a spacer 12 attached to plunger 4.

Housing 8 has a tubular extension 13 telescoping with a similar stationary tube 14 and communicating thereto at all positions of the plunger.

A worm gear housing 15 is connected to the closed end of the internal cylinder 2 and tube 14 is attached to this housing. Housing 15 contains a worm wheel 16 which rotates in bearings provided in 15, but which is prevented from moving in an axial direction. The bore of this worm wheel is threaded for valve stem 17 which is connected to valve 10. Valve 10 is keyed to housing 8 by key or feather and slot connection 10ª, in such manner as to permit axial movement but to prevent rotation.

Worm wheel 16 meshes with a worm on operating stem 18 which passes through the body of the valve concentrically with exhaust port 19. Stem 18 is operated in the usual manner by some form of hand mechanism such as the stand and hand wheel 20. It is obvious, however, that electrical, hydraulic, or other form of power may be used for this purpose.

When stem 18 is rotated it in turn rotates worm 16 which moves valve 10 in an axial direction and uncovers one or the other of ports 9 and 11. The length of valve 10, however, is such that when one port is open the other is necessarily closed.

To close plunger 4, stem 18 is revolved in the necessary direction to move valve 10 to the right. Valve 10 first closes port 11 and then opens port 9. This exhausts pressure from annular chamber 6 through passage 7, tubes 13 and 14, passages 21, housing 15 and exhaust port 19 to the atmosphere or some region of lower pressure. The reduction of pressure in annular chamber 6 moves plunger 4 to the right, thus tending to close port 9 and the movement of plunger 4 will cease unless valve 10 is further moved to the right. It will thus be seen that plunger 4 can move no faster than valve 10 because any movement in this direction of plunger 4 relative to valve 10 tends first to cut off port 9 restoring pressure in chamber 6 and then if further continued, to open port 11 dropping pressure in chamber 5 and actually reversing the motion of the plunger 4.

To open plunger 4, valve 10 is moved to the left first closing port 9 and then opening port 11 which exhausts pressure from chamber 5 which in turn causes plunger 4 to move to the left and follow the motion of valve 10. The motion of plunger 4 automatically tends to cut off port 11 and it is thus clear that plunger 4 can move no faster than valve 10.

It is a characteristic of this design that any motion of plunger 4 relative to valve 10 tends automatically to correct itself.

When plunger 4 is being closed by exhausting chamber 6, pressure is supplied to chamber 5 through port 22. When plunger 4 is being opened by exhausting chamber 5, pressure is supplied to chamber 6 by leakage through the fit 23 around the plunger. Port 22 is considerably smaller in area than port 11 and therefore the pressure may be exhausted from chamber 5 notwithstanding the fact that it is at the same time entering through port 22.

The only points at which leakage may take place in the control mechanism are through the clearance between valve 10 and housing 8 and through the clearance between tubes 13 and 14. If this leakage is objectionable it may be cut off when the plunger 4 is either open or closed, by providing a shut-off valve 24 in the exhaust passage 19. This valve would then normally be closed and be opened only when it was required to open or close plunger 4, and after completing this operation valve 24 would be closed again.

Fig. 2 shows an alternative means of moving valve 10. Hand gear 20, stem 18, worm nut 16, and the threads or rod 17, are omitted and a piston 25, is attached to rod 17, Valve 10 is then operated by alternately admitting and exhausting pipe line pressure to and from the two ends of cylinder 15 by means of pipes 26 and 27 leading outside of body 1.

It will be obvious to those skilled in the art that modification may be made in details of construction and arrangement without departing from the spirit of the invention which is not limited to such matters or otherwise than as the prior art and the appended claims may require.

I claim:

1. In a plunger valve having a body, a cylinder between which and the body there is provided a water way, a plunger arranged in the cylinder and cooperating with the body as a seat, cylindrical and annular chambers interposed between the cylinder and plunger and each having fluid pressure connections, and in combination therewith controlling mechanism consisting of an exhaust valve housing mounted in and movable with the plunger and provided with spaced exhaust ports to the annular and to the cylindrical chambers, an exhaust connection from the exhaust valve housing to the exterior of the body and including a substantially radial element and an axial element arranged in the cylinder and consisting of telescopically sliding tubes, an exhaust valve for covering one and uncovering the other of said ports, and mechanism arranged in said exhaust element for shifting the exhaust valve in respect to its housing, substantially as described.

2. The combination with a conduit casing having a fixed internal body and a contracting portion forming a valve seat, of a plunger cooperating with said seat and shaped to form with said body a plurality of fluid pressure chambers, and means for controlling the fluid pressures in all of said chambers comprising a valve means within said body and plunger adapted to separately control fluid pressure connections to said chambers in all positions of the plunger.

3. The combination with a conduit casing having a fixed internal body and a contracting portion forming a valve seat, of a plunger cooperating with said seat and shaped to form with said body a plurality of fluid pressure chambers, and means for controlling the fluid pressures in all of said chambers comprising a valve means within said body and plunger adapted to separately control fluid pressure connections of said chambers to a single fluid conduit in all positions of the plunger.

4. The combination with a conduit casing having a fixed internal body and a contracting portion forming a valve seat, of a plunger cooperating with said seat and shaped to form with said body a plurality of fluid pressure chambers, and means for controlling the fluid pressures in all of said chambers comprising a valve means within said body and plunger adapted to separately control fluid pressure connections of said chambers to a single exhaust fluid conduit in all positions of the plunger.

5. In a plunger valve having a body, a cylinder between which and the body there is provided a water way, a plunger arranged in the cylinder and cooperating with the body as a seat, cylindrical and annular chambers interposed between the cylinder and plunger and each having fluid pressure connections, and in combination therewith an exhaust valve mechanism arranged in the valve and adapted to exhaust the cylindrical and the annular chambers, and mechanical means for operating said mechanism from the exterior of the valve body.

6. In a plunger valve having a body, a cylinder between which and the body there is provided a water way, a plunger arranged in the cylinder and co-operating with the body as a seat, cylindrical and annular chambers interposed between the cylinder and plunger and each having fluid pressure connections, and in combination therewith an exhaust valve housing carried by the plunger and ported to the cylindrical and to the annular chambers and provided with a tube, a worm gear housing carried by the cylinder and provided with a tube overlapping the first mentioned tube and with an exhaust passage to the exterior of the valve body, an exhaust valve co-operating with said housing and having its spindle arranged in said tubes, a worm nut in said worm gear housing for said spindle, a worm shaft in said exhaust passage, and a valve for closing the exhaust passage.

7. In a plunger valve having a body, a cylinder between which and the body there is provided a water way, a plunger arranged in the cylinder and co-operating with the body as a seat, cylindrical and annular chambers interposed between the cylinder and plunger and each having fluid pressure connections, and in combination therewith an exhaust valve housing carried by the plunger and ported to the cylindrical and to the annular chambers and provided with a tube, a gear housing carried by the cylinder and provided with a tube overlapping the first mentioned tube and with an exhaust passage to the exterior of the valve body, an exhaust valve co-operating with said housing and having its spindle arranged in said tubes, a worm nut in said worm gear housing for said spindle, and a worm shaft in said exhaust passage.

8. In a plunger valve having a body, a cylinder between which and the body there is provided a water way, a plunger arranged in the cylinder and co-operating with the body as a seat, cylindrical and annular chambers interposed between the cylinder and plunger and each having fluid pressure connections, and in combination therewith an exhaust valve housing mounted in and carried by the plunger and having an annular port and a passage from said annular port to the annular chamber and also having a port to the cylindrical chamber and a passage to the outside of the valve body, an exhaust sleeve valve for covering one and uncovering the other of said ports and adapted to exhaust through said passage, and means accessible from the exterior of the valve body for adjusting the exhaust valve in respect to a fixed part of the body, substantially as described.

9. The combination with a conduit casing having a fixed internal body and a contracting portion forming a valve seat, of a plunger cooperating with said seat and shaped to form with said body a plurality of fluid pressure chambers, and means for controlling the fluid pressures in all of said chambers comprising a valve means carried within said conduit casing adapted to separately control fluid pressure connections to said chambers in all positions of the plunger.

10. The combination with a conduit casing having a fixed internal body and a contracting portion forming a valve seat, of a plunger cooperating with said seat and shaped to form with said body a pair of fluid pressure chambers, and means for controlling the fluid pressures in both of said chambers comprising a single valve means within said body and plunger adapted to alternatively vary fluid pressure connections to said chambers and acting to automatically adjust the relative pressures in said chambers to balance and hold said plunger in any desired set position of said valve means.

11. The combination with a conduit casing having a fixed internal body and a contracting portion forming a valve seat, of a plunger cooperating with said seat and shaped to form with said body a pair of fluid pressure chambers, connections from said chambers to a pair of valve ports and valve means within said conduit casing controlling said ports and acting to restrict one port while opening the other, movement of the plunger automatically adjusting said valve with relation to said ports to hydraulically balance said plunger at any desired opening according to the set position of said valve.

12. The combination with a conduit casing having a fixed internal body and a contracting portion forming a valve seat, of a plunger cooperating with said seat and shaped to form with said body a pair of fluid pressure chambers, an exhaust pressure connection, openings from both of said chambers to said connection, and a single valve means within said conduit casing adapted to restrict one of said openings while widening the other so as to automatically hydraulically balance said plunger in set position.

13. In a flow control system an outer conduit casing and inner fixed member forming a fluid way between them, a hollow sliding plunger element forming with said fixed member a cylindrical chamber and an annular chamber, means whereby one of said chambers is for opening and the other for closing the plunger, means to connect both chambers to exhaust including a longitudinally movable exhaust valve member within said cylindrical chamber common to the control of exhaust from both chambers, and means for operating said valve member from outside of said conduit to control the pressure in said cylindrical chamber.

14. In a flow control system an outer conduit casing and inner fixed member forming a fluid way between them, a hollow sliding plunger element forming with said fixed member a cylindrical chamber and an annular chamber, common means to connect both chambers to exhaust outside of the conduit including a longitudinally movable exhaust valve member within said cylindrical chamber, and means for operating said valve member from outside of said conduit to control the pressure in said cylindrical chamber.

15. In a flow control system an outer conduit casing and inner fixed member forming a fluid way between them, a hollow sliding plunger element forming with said fixed member a cylindrical chamber and an annular chamber, a longitudinally movable exhaust valve member within said cylindrical chamber directly controlling fluid flow from both of said chambers, and means for operating said valve member from outside of said conduit to control the pressure in said cylindrical and annular chambers, and means for closing the exhaust connection when the plunger is open.

16. In a valve structure an outer conduit casing and inner fixed member forming a fluid way between them, a hollow slidable plunger member forming with said fixed member a cylindrical chamber and an annular chamber, a passage carried by said plunger and extending inward from said annular chamber and having communication with a valve opening, a valve for controlling said opening and means for operating said valve from outside of said conduit.

17. In a valve structure an outer conduit casing and inner fixed member forming a fluid way between them, a hollow slidable plunger member forming with said fixed member a cylindrical chamber and an annular chamber, a passage carried by said plunger and extending inward from said annular chamber and having communication with a valve opening, a valve having a limited lost motion connection with said plunger for controlling said opening and means for operating said valve from outside of said conduit.

18. In a valve structure an outer conduit casing and an inner fixed member forming a fluid way between them, a hollow slidable plunger member forming a cylindrical operating chamber with said fixed member, a second operating chamber, a control valve means comprising a control connection extending outside of the conduit, and having valve openings movable with said plunger and communicating with said chambers, a valve having a lost motion connection to said plunger and controlling said opening, and means for operating said valve from outside of the conduit.

19. In a valve structure an outer conduit casing and an inner fixed member forming a fluid way between them, a hollow slidable plunger member forming a cylindrical chamber with said fixed member, means forming a second chamber for controlling plunger movement, a control valve means comprising a control connection extending outside of the conduit, and having a valve opening movable with said plunger, a valve having a lost motion connection to said plunger and controlling said opening, and means for operating said valve from outside of the conduit, said control connection comprising a telescopic coupling between relatively fixed and movable parts and adapted to have direct communication with each of said chambers.

20. In a valve structure an outer conduit casing and an inner fixed member forming a fluid way between them, a hollow slidable plunger member forming a cylindrical chamber with said fixed member, a second chamber for controlling plunger movement, an exhaust valve means comprising an exhaust connection extending outside of the conduit, and having valve openings movable with said plunger and alternatively connectible with said chambers, a valve having a lost motion connection to said plunger and controlling said opening, and means for operating said valve from outside of the conduit.

21. In a valve structure an outer conduit casing and an inner fixed member forming a fluid way between them, a hollow slidable plunger member forming a cylindrical chamber with said fixed member, a second chamber for controlling plunger movement, an exhaust valve means comprising an exhaust connection extending outside of the conduit, and having valve openings movable with said plunger, a valve having a lost motion connection to said plunger and alternatively controlling said openings, and means for operating said valve from outside of the conduit, said exhaust connection comprising a telescopic coupling between relatively fixed and movable parts.

22. In a valve structure, an outer conduit casing, an inner fixed member spaced therefrom so as to form a fluid way therebetween, a plunger slidably carried by said inner member, and means forming piston and cylinder elements, including opening and closing chambers for controlling plunger movement in opposite directions, said elements being disposed within said inner member, means forming passages leading from each of said chambers to a point of exhaust, and means also disposed within said inner member for controlling directly fluid flow from said chambers through said passages.

23. In a valve structure, an outer conduit casing, an inner fixed member spaced therefrom so as to form a fluid way therebetween, a plunger slidably carried by said inner member, and means forming piston and cylinder elements, including opening and closing chambers for controlling plunger movement in opposite directions, said elements being disposed within said inner member, means forming passages leading from each of said chambers to a point of exhaust, and means also disposed within said inner member for controlling directly fluid flow from said chambers through said passages, said latter means including a plurality of ports and a valve axially disposed to said elements and longitudinally movable to control alternatively said ports.

CHESTER W. LARNER.